United States Patent [19]
Ryan

[11] Patent Number: 5,470,924
[45] Date of Patent: Nov. 28, 1995

[54] PHENOL FORMALDEHYDE RESINS

[76] Inventor: Barry W. Ryan, 214 Broad St., Labrador, Queensland 4000, Australia

[21] Appl. No.: 122,598

[22] PCT Filed: Apr. 2, 1992

[86] PCT No.: PCT/AU92/00138

§ 371 Date: Nov. 24, 1993

§ 102(e) Date: Nov. 24, 1993

[87] PCT Pub. No.: WO92/17528

PCT Pub. Date: Oct. 15, 1992

[30] Foreign Application Priority Data

Apr. 5, 1991 [AU] Australia .................................. PK5454

[51] Int. Cl.[6] .................................................... C08F 6/00
[52] U.S. Cl. ..................... 525/501; 528/129; 528/137; 528/142; 528/144; 528/147; 528/155; 528/156; 528/161; 528/176
[58] Field of Search ....................... 528/129, 137, 528/142, 144, 147, 161, 176, 361, 155, 156; 525/501

[56] References Cited

U.S. PATENT DOCUMENTS 5,075,414  12/1991  Dailey, Jr. ............................. 528/129

FOREIGN PATENT DOCUMENTS 20144  1/1934  Australia .
101412  1/1937  Australia .
2102820  2/1983  United Kingdom .

*Primary Examiner*—Morton Foelak
*Assistant Examiner*—Richard Jones

[57] ABSTRACT

A process for forming a phenol formaldehyde resin including the steps of: (i) forming a first additive including a glycol and an aromatic dicaborxylic acid; (ii) adding said first additive as well as an alpha hydroxy acid to a first resin component comprising resin precursors including phenol, formaldehyde, an acid catalyst or a base catalyst after said precursors have reacted for 40–55 minutes and/or when water has separated from said precursors; (iii) isolating or storing said first resin component which is maintained in a non cured state by the addition of said first additive; (iv) forming a second additive including zinc chloride, an alpha hydroxy acid, para toluene sulphonic acid, sulphuric or hydrochloric acid and a non aqueous solvent; (v) adding said second additive to a second resin component which includes resin precursors phenol, formaldehyde, methanol and an aliphatic dicarboxylic acid after said precursors have reacted for 20–30 minutes; (vi) combining said first resin component and said second resin component and subsequently allowing a mixture formed thereby to cure. There is also included both the first resin component and the second resin component whereby in each component the mole ratio between formaldehyde and phenol is greater than unity.

27 Claims, 1 Drawing Sheet

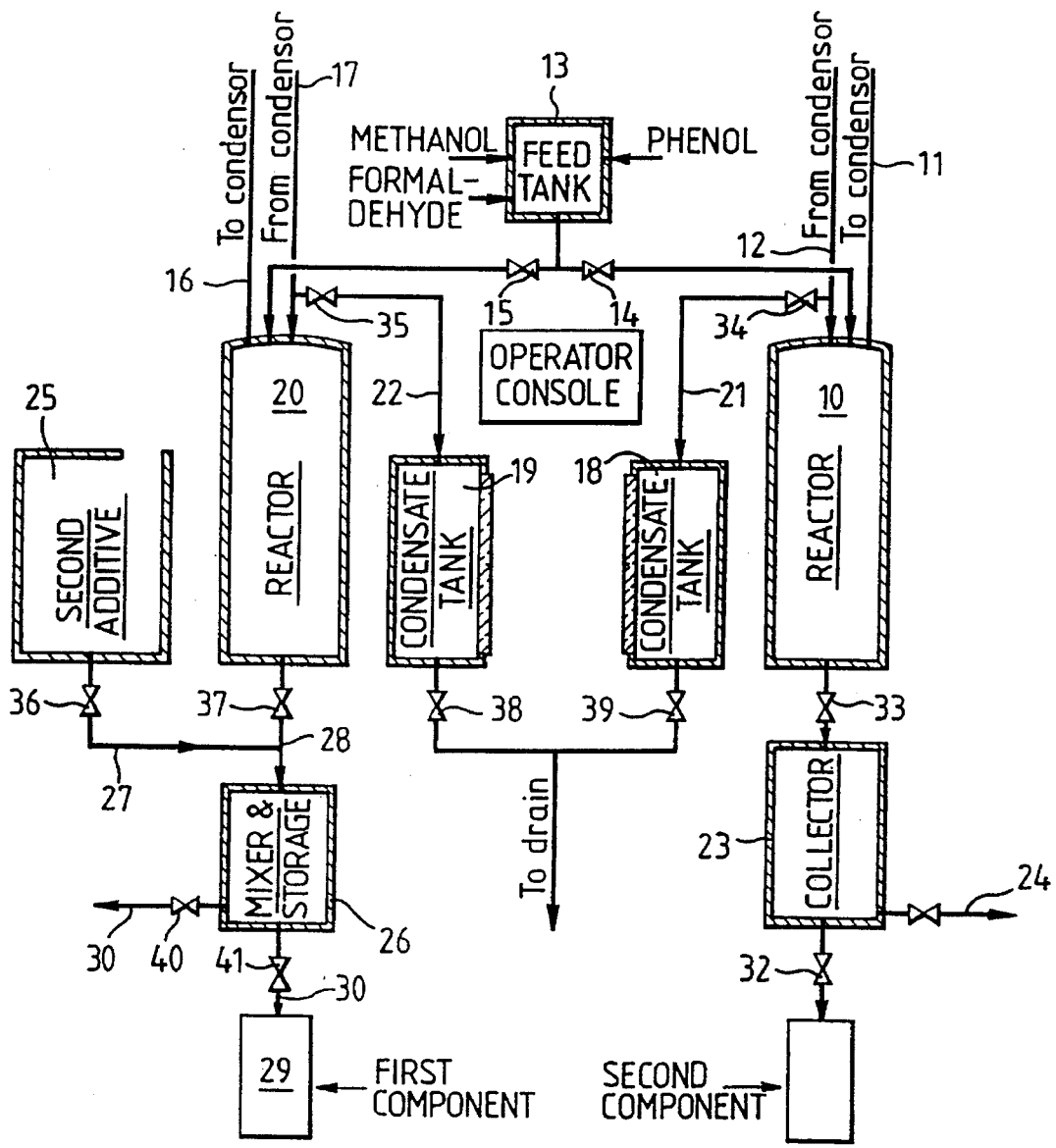

PHENOL FORMALDEHYDE RESINS

This invention relates to improved phenol formaldehyde resins which have superior qualities of fire resistance, mouldability, insulation, and stability when compared to conventional resins.

Conventional phenol formaldehyde resins may be formed from phenol and formaldehyde wherein formaldehyde may react with the aromatic ring at the ortho and/or para positions. This is assisted by heating but can be a slow process unless a basic or acid catalyst is included. The main reactions involve direct addition of phenol and formaldehyde yielding methylol derivatives as well as direct condensation of phenol and a methylol derivative with loss of water yielding methylene derivatives. The direct condensation reaction involving the formation of methylene groups between adjacent aromatic rings is catalysed by bases and is favoured by an excess of phenol ie. a deficiency of formaldehyde. In contrast the addition reaction yielding methylol derivatives is catalysed by strong bases and is favoured by an excess of formaldehyde.

If the above reactions are allowed to continue assisted by heating hydrophobic compounds eventually separate out as a lower or base layer. When this layer is freed from an aqueous layer and further volatiles are removed by distillation under reduced pressure there is produced a resinous product of moderate molecular weight known as a resol or novolac which can be made to yield a cross linked polymeric network.

Novolacs involve the initial formation of dehydroxyphenol methanes and on further condensation and methylene bridge formation form a fusible and soluble linear polymers of phenol groups separated by methylene bridges where ortho and para links occur at random.

In contrast resol polymers are formed by condensation of methylol phenols either through methylene linkages or through ether linkages. If these reactions are carried further large numbers of phenolic nuclei can condense to give a repeating network.

Thus in summary the four major reactions in phenolic resin chemistry are (i) addition to give methylol phenols; (ii) condensation of a methylol phenol and a phenol to give a methylene bridge; (iii) condensation of ether bridges of methylene bridges and formaldehyde, the latter reacting again in reaction (i).

Phenolic resins known as one stage resins may be produced by charging all reactants comprising phenol, formaldehyde, and alkaline catalyst into a resin kettle and reacted together. The ratio of formaldehyde to phenol is about 1'25:1. In contrast two stage resins are made with an acid catalyst and only part of the necessary formaldehyde is added to the kettle producing a mole ratio of about 0.8:1. The rest of the formaldehyde is added as hexamethylene tetramine or paraformaldehyde which decomposes in the final curing step with heat and moisture present to yield formaldehyde and ammonia which acts as the catalyst for curing.

The procedures for one and two stage resins are similar and the same equipment is used for both. The reaction is exothermic and cooling is required. The formation of a resol or novolac is evidenced by an increase in viscosity. Water is driven off under vacuum and a thermoplastic A-resin or resol, soluble in organic solvents remains. The material is dumped from the kettle, cooled and ground to a fine powder. At this point colorants, lubricants, fillers and if a two stage resin is required enough hexamethylene tetramine to give a final formaldehyde phenol mole ratio of 1'5:1 is added. The mixture is rolled on heated mixing rolls where the reactions are carried further to the point where the resin is in the B stage or resitol nearly insoluble in organic solvents but still fusible under heat and pressure. The resin is then cooled and cut into final form. The C stage or resite which is the final, infusible, cross linked polymer is reached on subsequent fabrication eg. by moulding.

The resins produced as described above are used in compression or transfer moulding yielding products that are heat resistant, stable and resistance to cold flow. They are also used as laminating resins, bonding resins, casting resins, coatings and adhesives and ion-exchange resins.

Conventional phenol formaldehyde resins as described above do not have good shelf life and are relatively unstable so that storage and transportability is a major problem. Also conventional phenol formaldehyde resins have relatively low temperature resistance which is of the order of 100°–300° C. The instability of conventional phenol formaldehyde resins is due to the fact that such resins contain water which separates out after a period of time from the resin to form separate layers of resin and water. This product cannot be used commercially.

It is therefore an object of the invention to provide phenol formaldehyde resins which have improved properties and in particular flame resistance or fire resistance properties.

It is also a further object of the invention to provide a process for preparation of such improved phenol formaldehyde resins or precursors thereof.

A further object of the invention is to provide a first component resin and a second component resin which may when mixed together form a phenol formaldehyde resin.

The first component may be formed from phenol formaldehyde resin precursors as well as a first additive which may prevent solidification or curing of the first component resin.

The second component resin may be formed from phenol formaldehyde resin precursors as well as a second additive which may prevent solidification or curing of the second component resin.

The first additive may include the following compounds:

(i) a glycol; and (ii) an aromatic dicarboxylic acid or aromatic tricarboxylic acid or anhydride of such acids.

Suitably the glycol and the aromatic dicarboxylic acid or tricarboxylic acid or anhydride thereof are added as a mixture. At the same an alpha hydroxy acid may be added to the mixture of phenol formaldehyde resin precursors.

The glycol is preferably glycerol for ease of convenience, availability, and also because of its relatively low cost. However other glycols may be used and these can be selected from propylene glycol, ethylene glycol, 1,3 propane diol, 1,2 butanediol, meso - 2,3 butanediol pinacol, pentaerythritol and mesohydrobenzoin.

The aromatic dicarboxylic acid or tricarboxylic acid is preferably utilised as an anhydride to avoid adding additional water to the reactor. Therefore the preferred additive is phthalic anhydride. However it is also possible to utilise phthalic acid, isophthalic acid or terephthalic acid or hemimellitic acid, trimellitic acid or trimesic acid.

Suitably the glycerol and phthalic anhydride is mixed in a separate additive tank or reactor prior to being added to the reactor containing the phenol and formaldehyde resin precursors. The ratio of glycerol to phthalic anhydride may be from 2:1 to 5:1. When mixed it may form glycerol phthalate which may then be linked to any available hydroxy, carboxyl or methylene groups in the reactor to form a suitable condensation product. The lactic acid may also be utilised to neutralise any base present in the reactor such as sodium hydroxide.

The alpha hydroxy acid is suitably selected from lactic acid, glycolic acid, hydroxybutyric acid, mandelic acid, melic acid, tartaric acid, mesotartaric acid or citric acid. Preferably lactic acid is utilised because of its availability and relatively low cost.

The second additive may include the following compounds:

(i) zinc chloride (ii) an alpha hydroxy acid (iii) para toluene sulphonic acid (iv) sulphuric or hydrochloric acid (v) a non aqueous solvent; and (vi) glycerol.

The alpha hydroxy acid may include any of the alpha hydroxy acids already discussed above in regard to the first additive. Preferably lactic acid is utilised.

The non aqueous solvent is preferably one which is water miscible and thus may be an alcohol having one, two or three carbon atoms. Methanol is preferred because of its commercial availability and low cost but ethanol may also be utilised if desired.

In regard to manufacture of the first component of the invention a reactor may have phenol and formaldehyde added thereto so as to form a phenol formaldehyde resin together with other necessary reactants such as a base which may be selected from NaOH or KOH or other suitable bases such as calcium hydroxide barium hydroxide, sodium carbonate or organic amines. An acid catalyst may also be used but a base catalyst is preferred. After the reaction has been proceeding for a period of some 40–55 minutes (preferably 50 minutes) the first additive may be added to the reactor to prevent further curing of the phenol formaldehyde resin precursors as described above.

It is important to determine the stage when it is necessary to add the first additive and this may be determined when water which is present in the reactor separates out from the reactor contents ie. when a two phase solution is obtained having immiscible layers. If a two phase sample from the reactor contents is not obtained then addition of the first additive is premature.

Commercially available formaldehyde has approximately 46% water and commercially available phenol if not in the molten state has approximately 10% water. Water will also be generated during the reaction. Condensate from the reaction may be passed into a condensate tank equipped with a sight glass so that the volume of water removed may be calculated. It is important in this regard to allow for 10% water of reaction.

In this regard it will be appreciated that the calculation would have already been made to determine the amount of water that would have to be removed from the reactor. This calculation can be made from the weights or volumes of the reactants. The reaction in the reactor may be substantially complete.

In relation to production of the second component this may take place in the following manner.

In one reactor methanol, formaldehyde and phenol are added as precursors to form a phenol formaldehyde mixture. In this reactor there also be added an aliphatic dicarboxylic acid.

The aliphatic dicarboxylic acid is suitably oxalic acid by reason of commercial availability and low cost but this does not preclude any other suitable acid being used such as malonic acid, succinic acid, glutaric acid, adipic acid, pimelic acid, suberic acid, azelaic acid or sebacic acid. All these acids are saturated acids. It is also possible to use unsaturated acids such as maleic acid or fumaric acid.

After the second component resin precursors have reacted for a relatively short period of time eg. 20 to 30 minutes the phenol formaldehyde resin precursors are mixed with the lactic acid, para toluene sulphonic acid, zinc chloride, glycerol and sulphuric acid or hydrochloric acid as well as methanol. Preferably in this embodiment the phenol formaldehyde precursors are passed from an initial reactor to a mixing tank containing the second additive ingredients. Previously the second additive ingredients have already been mixed together in an additive tank. The second component in liquid form may then be obtained from the mixing tank. This process may take 40 to 50 minutes.

Reference may now be made to a flow sheet illustrated on the attached drawing which depicts diagrammatically the apparatus used in the invention.

In the drawing there is shown reactor 10 which communicates with a top condensor (not shown) through forward line 11 and return line 12. The top condensor cools down vapours introduced into reactor 10 before returning the liquid vapour (eg formaldehyde vapour and phenol vapour) to reactor 10. Sodium hydroxide may be passed into reactor 10 manually through an access point (not shown) or passed into reactor 10 through a supply line (not shown). There is also provided in reactor 10 a series of concentric coils (not shown) for the purpose of the introduction of steam when heating of reactor 10 is required or cold water when cooling of reactor 10 is required. This may be accomplished by suitable valving.

There is also shown a feed tank assembly 13 which comprises a feed or supply tank for formaldehyde, a feed or supply tank for phenol, and a feed or supply tank for methanol. Each of these tanks are separate from each other and have separate lines to reactors 10 and 20 each operated by valves 14 and 15.

There is also illustrated reactor 20, forward line 16 and return line 17 to a top condensor (not shown) for the same purpose as the top condensor associated with reactor 10. Each reactor 10 and 20 has associated therewith as shown condensate tanks 18 and 19 together with supply lines 21 and 22.

There is also associated with each reactor 10 and 20 a large vacuum pump (not shown) which can evacuate the contents of the reactors as may be required. The vacuum pump may have a capacity of 30 psi. The vacuum pump can transfer quantities of reaction contents of reactors 10 and 20 into condensate tanks 18 and 19.

There is also provided collector tank 23 for reactor 10 having associated therewith cooling coils (not shown). The contents of tank 23 may be passed to storage tanks (not shown) for the various reactants by line 24 after removal of any surface water layer. The first component may be then be passed into the storage tank.

Reactor 20 also has associated therewith additive tank 25 in which the contents of the second additive may be mixed. The contents of reactor 20 and tank 25 may be passed into mixing tank 26 through lines 27 and 28. The second component may then be collected in storage tank 29 after passage through line 30. There is also shown line 31 for passage of the contents of mixing tank 26 to a storage bin (not shown). Also shown are valves 32, 33, 34, 35, 36, 36, 37, 38, 39, 40 and 41. Samples of reaction contents of reactor 10 may be obtained from a reactor valve (not shown).

In relation to manufacture of the first component, the preferred procedure is described as follows:

1. Pass formaldehyde and phenol into reactor 10.
2. Add NaOH.
3. Pass steam into heating coils associated with reactor 10.
4. At 60° the water is turned on for cooling purposes.
5. The reaction then starts which is visible in the sight glass at the side of reactor 10. The rate of temperature increase is suitably no faster than 3° C. per minute.
6. The condensors are turned on after 30 minutes.
7. The temperature in reactor 10 is not allowed to exceed 95° C.
8. When the reaction finishes after 50 minutes the vacuum pump if desired may be turned on to cool the temperature to 90° C.
9. Samples of reaction contents from reactor 10 are now taken to determine the presence of water which has a cloudy colour.
10. The first additive is now added to reactor 10 and the temperature cooled to 85° C. and then 80° C. followed by the addition of lactic acid.
11. The temperature in reactor 10 may then rise to 96° C. with preferably the vacuum pump operating until the appropriate amount of water is removed from reactor 10. At the same time methanol may be pumped into the methanol feed tank.
12. The reactor 10 may then be cooled to 60° C. and methanol is added to replace the water lost.
13. The temperature of reactor 10 is maintained around 87° C. for as long as possible with the temperature of the reactor never exceeding 100° C.
14. The steam is left open and the reactor temperature drops to 76°–77° C. before enough water is drawn off from the reactor into the condensate tank 18 or alternatively water may be removed after the reaction contents have been passed into collection tank 23.
15. When the proper amount of water has accumulated in condensate tank 18 the vacuum is decreased to zero. The vacuum pump is then turned off as well as the cooling water for the vacuum pump. The steam is also turned off.
16. The cooling process then commenced with the temperature of reactor 10 dropping to 50° C. with agitation of the reactor contents occurring by an agitator (not shown).
17. When the reactor temperature reaches 45°–50° C. the remainder of methanol in the feed tank is passed to reactor 10.
18. When the reactor temperature reaches 40° C. the drain valve 33 is then opened and the reactor contents allowed to drain into the collection tank or blender 23 with the agitator still functioning.
19. When the reactor contents have cooled they are then passed into storage drums.

In relation to manufacture of the second component the preferred manufacturing procedure is set out below:

1. In tank 25 there is added methanol, ZnCl$_2$, PTSA, H$_2$SO$_4$, lactic acid, glycerol and the contents agitated to dissolve same to form the second additive.
2. The second additive neutraliser is passed into mixing tank 26 from additive tank 25 and the temperature is cooled till 22° C.
3. An agitator in reactor 20 (not shown) is turned on and formaldehyde added. Also oxalic acid dissolved in 1½ liters of water is added.
4. Phenol is then added to reactor 20. Heating is then commenced and at 65° C. the agitator is turned off and at 70° C. the steam is turned off.
5. The heat in reactor 20 is then allowed to rise to 100° C. suitably at a rate of 1° C. per 15 seconds.
6. The vacuum pump is turned on 15 minutes after the reaction. After the vacuum is commenced the reactor temperature is maintained close to 100° C. by increasing steam.
7. When the appropriate amount of water has been collected in condensate tank 19 the steam is turned off and the reactor cooled to 50° C.
8. When the reactor has cooled to 57° C. a small amount of methanol is added to reactor 20. Then over the period from 57° C. to 50° C. all methanol in the feed tank is passed to reactor 20.
9. The reactor agitator is then turned on and the reactor cooled to 40° C.
10. The reaction contents of reactor 20 are then passed into mixing tank 26 slowly. Subsequently the mixing tank is cooled to 20°–22° C.
11. After the reaction contents from reactor 10 have been passed into mixing tank 26 care is taken to avoid any rise in temperature.

Preferred amounts of ingredients in each of the first component and the second component are set out hereinbelow in liters in relation to manufacture of approximately 730 liters of first component and 668 liters of liquid ingredients and 395 kg of solid ingredients of the second component.

| FIRST COMPONENT | |
| --- | --- |
| NAOH (l) | 5.0–8.0 (preferably 6.5) |
| Formaldehyde (l) (54% H$_2$O) | 380–490 (preferably 462) |
| Phenol (l) | 190–227 (preferably 208) |
| glycerol phthalate (l) | 5.0–8.0 (preferably 6.5) |
| lactic acid (l) | 7.5–9.0 (preferably 8.25) |
| methanol (l) | 35–45 (preferably 40) |
| SECOND COMPONENT | |
| Methanol (l) | 200–260 (preferably 227) |
| ZnCl$_2$ (kg) | 0.75–4 (preferably 3.6) |
| PTSA (kg) | 320–400 (preferably 390) |
| Sulphuric acid (l) | 120–200 (preferably 187) |
| Lactic acid (l) | 28–45 (preferably 42) |
| Formaldehyde (l) (54% H$_2$O) | 120–140 (preferably 134) |
| Glycerol (l) | 20–35 (preferably 30) |
| oxalic acid (kg) | 1.5–2 (preferably 1.75) |
| Phenol (l) | 40–90 (preferably 48) |

Preferably the ratio of the second component to the first component for a given batch is 2:1 up to a maximum ratio of 4:1.

Also the above mentioned quantities of the ingredients for both the first component and the second component are given in relation to formation of a 730 liter batch of first component. Thus if a 1460 liter batch is desired the ingredients will have their amounts increased proportionately.

A similar analysis will apply to the liquid ingredients and solid ingredients of the second component.

The formaldehyde used in the first component is a 46% aqueous solution and may not include a stabiliser, requiring the temperature to be maintained above 30° C. to prevent paraldehyde formation. A 37% formaldehyde can be used with 7% methanol stabiliser.

The phenol which is used in the above process is pure phenol which at temperatures over 60° C. liquefies and thus is used in this form.

The NaOH used may be 1 kg per 2 kg of water ie. about 226 kg NaOH per 452 liters of water.

Lactic acid which is used is a viscous fluid but is pourable. The most concentrated solution available is used which has a maximum strength of 76%.

In regard to sulphuric acid concentrated sulphuric acid is used which is about 96–98% concentration.

In relation to the first component resin, formaldehyde and phenol are present in a ratio of greater than 1 and more suitably 2:1 or 3:1.

In relation to the second component resin, formaldehyde and phenol are present in a ratio of greater than 1 and more 1.75:1.40.

It will therefore follow in the phenol formaldehyde resin which is formed by the mixing of the first component resin and the second component resin that the mole ratio of formaldehyde to phenol will be greater than 1.

It will also be appreciated that the term "formaldehyde" as used herein may also include any formaldehyde precursor such as hexamethylene tetramine $(CH_2)_6$ $N_4$ which after treatment with an acidic species (eg phenol) will generate free formaldehyde.

The determination of the end point of the reaction which may produce the first resin component of the invention as set out hereinbelow.

When phenol reacts with formaldehyde a resinous product is formed and a little water is given off in the reaction. There is also water present in the mixture from the formaldehyde.

The resin is initially soluble in water but as the reaction proceeds the resin becomes less tolerant of water. This change in tolerance to water can be measured in two ways.

Water tolerance

Early in the reaction additional water can be added to a sample of the resin mixture to see how much water can be added before the mix becomes cloudy at 25° C. This ratio is called a water tolerance.

As the reaction proceeds there comes a time when no water is needed to be added because the mixture is already cloudy at 25° C.

To test the water tolerance a small sample (say 10 g) of the reaction mix is taken from the reaction vessel and cooled to 25° C. Water at 25° C. is added until the sample just turns cloudy. The amount of water added is noted and the weight or volume required to turn one gm of the reaction mix cloudy is taken as the tolerance ie if 8 gms water turn 10 gm mix cloudy the tolerance is 0.8 to 1.

Cloud Point

Because the reaction mixture contains water and the solubility of the resin in that water is affected by temperature the process of the reaction can be followed by doing a cloud temperature. Early in the reaction the temperature at which the mixture goes cloudy is very low. At some stage it reaches 0° C. and then later on 25° C. This is the same point at which the water tolerance is found to be zero.

To test the cloud temperature, a small sample (say 10 g) of the reaction mixture is taken from the reaction vessel and cooled with stirring (by thermometer) until it starts to become cloudy. This temperature is taken as the cloud point ie. if the mixture starts to go cloudy at 15° C., the cloud point is 15° C.

Cloud formation

Reaction time is affected by the pH of the reaction mixture. The reaction is slowed down once the glycerol/phthalate and lactic acid are added. The glycerol/phthalate could be added when the water tolerance is zero (or the cloud point is 25° C.—these are the same point) and the reaction continued until a cloud point of 80° C. is reached. The reaction would be run at 95° C. to cloud point 25° C. when the glycerol/phthalate is added and cooling applied to 90° C. and the lactic acid added (the lactic should be added not more than 5 minutes after the glycerol/phthalate is added. The reaction is then continued at 85°–90° C. until a cloud point of 80° C. is reached. Further small batches of resin should be produced to fine tune the end point determination and safety margins before large scale batches are made.

When mixed the first component and second component will react exothermically and provide a solid product or casting resin. This product can also be used by adding fillers to the first component eg any cellulose product such as mica, woodflour, cotton flock, chopped rags, fibreglass, nitrile rubbers, microballoons before mixing with the second component. The amount of filler that may be used can vary from 25–70% of the first component.

If it is desired to coat a rigid substrate such as steel or concrete a primer should be used to give adhesion. Suitable primers are EPOGARD self primer manufactured by GENERAL PAINTS or INTERNATIONAL PAINTS CC 25.

When it is desired to coat fibreglass substrates the mixture in its desired ratio and immediately after mixing is manually applied to the fibreglass by roller or other suitable applicator similar to current techniques for application of polyesters to fibreglass.

Foamed insulation may be achieved by adding a surfactant and foaming agent to the first component before admixture with the second component.

From the foregoing it can be appreciated that the two component phenol formaldehyde resin of the invention has very good stability and a very low water content.

The first component may be classified as a Resol (A-stage resin) or an alkaline catalysed thermosetting phenol-formaldehyde type resin consisting primarily of partially condensed phenol alcohols. Almost all the water has been removed from this product. This product has been stored in tinplate containers in a laboratory without any signs of deterioration for twelve months. Batches have been prepared with viscosities from 200 cps to 2600 cps.

The second component may be classified as an acid catalyst in further Resole and has been stored in glass in a laboratory for twelve months without any signs of deterioration. The viscosity of this material may be approximately 400 cps.

When two parts by weight of the first component is mixed with one part by weight of the second component the mixture begins to heat up due to a reaction between the two parts. The temperature begins to rise rapidly and the liquid turns to a solid mass. Some formaldehyde fumes are given off at this stage and until the reaction is complete.

The Gel time of a mixture of two parts first component and one part second component can be adjusted and was 20 minutes at 25° C. for one of the samples produced. Faster reacting material can be produced for use in resin transfer moulding and other similar application where a faster reaction time is an advantage.

Laminates

Laminates were made using powder bound chopped strand mat and a resin mix of two parts by weight first component and one part by weight second component. The laminates were layed up on a sheet of laminex coated with a silicone/wax release agent. The matrix was rolled out with a fluted metal roller to remove air bubbles. In the case of one laminate a sheet of plastic was placed over the laminate before it gelled and a heavy flat plate placed on top to give a smooth finish.

| | |
|---|---|
| Specific Gravity of Laminate | 1.28 (polyester with 25% glass 1.4) |
| GLass content | 25% |
| Tensile Strength | 60 MPa (equivalent to polyester) |
| Flexural Strength | 95 MPa (approx. 70% of typical polyester) |
| Flexural Modulas | 2.8 GPa (approx. 60% of typical polyester) |
| Flammability | Preliminary tests indicate that the laminate will not support combustion. When a propane torch flame is held on the surface of the laminate small pieces of blackened material pop off but these retain their original colour on the side away from the flame indicating that they have not burned. |

The phenol formaldehyde of the invention unlike phenol formaldehyde resins can be (1) used as a fibreglass resin to give an unburnable product at 3500° C. No other such PF resin can be used with fibreglass.

(2) cast to form moulds etc.

(3) painted onto timber thus making the timber fire resistant.

(4) made to foam (like polystyrene) to form an insulating material (R=3.5) which will not burn. A test has been carried out whereas: methanol was poured continually onto a piece of foam constructed in accordance with the invention and ignited— the foam of the invention after 5 hours of continuous flaming was unaffected.

(5) used as a timber preservative for posts etc., resisting fire, termites, and acts as a waterproofing.

(6) used as a glue for polystyrene and timber.

Advantages of the phenol formaldehyde resins of the invention are:

(a) A batch can be cooked in an hour while other conventional resins take up to ten hours.

(b) It has a storage life of 3–5 years at least. Other PF products have a maximum of 4–6 months.

(c) Stability is not affected as it does not separate—other PF products have 40% water which "layers" out.

(d) processing costs can be as cheap as $1.00 per kilogram which are far cheaper than conventional PF resins.

Australian prices of phenol and formaldehyde are more expensive than in the U.S.A. Timber coatings have a small amount of another additive present to give a glossy finish.

(e) The resins of the invention do not give off toxic fumes on being exposed to high temperatures, eg. in a burning building, or heat up to 3500° C. If subjected to temperatures in excess of 5000 C the "C", "H" and "O" components will give $CO_2$ and $H_2O$ but does not give off toxic gases like cyanide as does polyurethane, one of its competitors.

Thus for example a demonstration test was done where a piece of steel was placed on top of a section of solid resin 1 cm thick which was being held in a human hand. Using an oxy-acetylene torch at 3500° C., the steel was melted and burnt away. The heat did not travel through the resin being held.

(f) Acrylic paints bond to resin exceptionally well.

Uses of the phenol formaldehyde resins of the invention include the following:

(i) fibreglass panels coated with the resin may be cut and will not crack. The panels will also not burn or give off toxic fumes.

(ii) panels with treated wood or fibreglass exteriors in a foam sandwich give fireproofing and insulation.

(iii) paper and cardboard could be impregnated with the resin as cores for doors or partitions.

(iv) the resin can be painted over wood to give fire retardance.

(v) it can be used for water proofing wood for use in posts, walls, and resistance to termites.

(vi) it can be used on marine piles to prevent marine growth.

(vii) it can be bonded to polystyrene to make floating pontoons.

(viii) petrol, oil, kerosene do not cause any deterioration or corrosion.

(ix) it can be used as a coating on cement and thus provide a surface that is easily cleared and not capable of causing contamination.

(x) it can be used for filling unused mine shafts or blocking them to prevent fire.

(xi) it can be used for casting by the addition of cellulose compounds. Casts may be drilled or machined.

(xii) the resin may be used to form brake linings, tackifiers for rubber as fillers, plywoods, foundry sand cores, oil filters, pulp preforms in the case of travel goods or car fascia panels, water lubricated bearings gear wheels and electrical switch and terminal panels.

It will also be appreciated that resin properties can be varied in the manufacture thereof by variations in the relevant amounts of PTSA and $H_2SO_4$.

I claim:

1. A process for forming a phenol formaldehyde resin consisting essentially of the steps of:

(i) forming a first additive by mixing a glycol with an aromatic dicarboxylic acid or anhydride of said acid in a ratio of from 2:1 to 5:1;

(ii) forming a first resin component by reacting phenol with excess formaldehyde in the presence of non-aqueous solvent and a catalyst for about 40–55 minutes until water has separated from the reactants forming a two phase solution having immiscible layers, and then adding said first additive as well as an alpha hydroxy acid;

(iii) isolating or storing said first resin component with said first additive formed in (ii), said first resin component being maintained in a non-cured state by the addition of said first additive;

(iv) forming a second resin additive by mixing a solution consisting essentially of zinc chloride, glycerol, an alpha hydroxy acid, p-toluene sulphonic acid, sulphuric or hydrochloric acid, and a non-aqueous solvent;

(v) forming a second resin component by reacting phenol with excess formaldehyde in the presence of methanol and an aliphatic dicarboxylic acid catalyst for about 20–30 minutes, and then adding said second additive;

(vi) combining the components formed in (ii) and (v) in a ratio of from about 2:1 to 4:1 to form a phenol formaldehyde resin and then allowing the mixture thus formed to cure.

2. A process as claimed in claim 1 wherein in step (i) the first additive is formed from glycerol and phthalic anhydride.

3. A process as claimed in claim 1 wherein the alpha hydroxy acid utilised in step (ii) is lactic acid.

4. A process as claimed in claim 1 wherein in step (v) the second resin component precursors are passed from an initial tank to a mixing tank containing the second additive.

5. A process as claimed in claim 1 wherein prior addition of said first additive in to step (ii) the first resin component is initially formed by passing NaOH, phenol and formaldehyde into a first reactor followed by heating whereafter when the temperature of the first reactor reaches 60° C. the first reactor is cooled to initiate a reaction between the first resin components whereby the temperature of the reactor will increase not faster than 3° C. per minute with the temperature not being allowed to exceed 95° C. and the reactor being cooled to 90° C. after the reaction is completed after 50 minutes reaction time.

6. A process as claimed in claim 5 whereby in step (ii) the first additive is added to the first reactor and the temperature cooled to 85° C. and then 80° C. followed by addition of lactic acid.

7. A process as claimed in claim 6 wherein after addition of lactic acid the temperature of the first reactor rises to 96° C. with water being removed therefrom and the first reactor is cooled to 60° C. with methanol being added to replace the water lost.

8. A process as claimed in claim 7 wherein the temperature of the first reactor is maintained around 87° C. for about 50 minutes.

9. A process as claimed in claim 8 wherein the temperature of the first reactor is allowed to drop to 76°–77° C. followed by removal of water.

10. A process as claimed in claim 9 wherein the contents of the first reactor are agitated until the temperature reaches 40° C. whereafter the reaction contents are removed from the first reactor.

11. A process as claimed in claim 1 whereby after all components of the second additive are dissolved in step (iv) the second additive is passed to a mixing tank whereby the temperature cooled to 22° C.

12. A process as claimed in claim 1 whereby in step (v) formaldehyde, aqueous solution of oxalic acid and phenol are sequentially added to a second reactor, followed by heating and agitating.

13. A process as claimed in claim 12 wherein at 70° C. heating of the second reactor is stopped after agitation is stopped at 65° C.

14. A process as claimed in claim 13 wherein the heat in the second reactor is allowed to rise to 100° C. suitably at a rate of 1° C. per 15 seconds and water produced by reaction of the phenol and formaldehyde is removed under vacuum.

15. A process as claimed in claim 14 wherein the second reactor is maintained at 100° C. for about 20 to about 30 minutes before cooling to 50° C.

16. A process as claimed in claim 15 wherein over the period wherein the second reactor is cooled from 57°–50° C. methanol is added to the second reactor.

17. A process as claimed in claim 15 wherein the reactor after reaching 50° C. is subsequently cooled to 40° C. whereafter the contents of the second reactor are passed to the mixing tank containing the second additive which is then cooled to 20°–30° C.

18. A process as claimed in claim 7 wherein in step (ii) the first resin component is formed from 5.0–8.0 l of NaOH 380–490 l of formaldehyde 5.0–8.0 l of glycerol phthalate 190–227 l of phenol 7.5–9.0 l of lactic acid and 35–45 l of methanol.

19. A process as claimed in claim 18 wherein in step (iv) the second resin component is formed from 200–260 l of methanol 120–200 l of sulphuric acid 28–45 l of lactic acid 20–35 l of glycerol 120–140 l of formaldehyde (54% $H_2O$)

40–90 l of phenol 0.75–4.0 kg of zinc chloride

300–400 kg of para toluene sulphuric acid 1.55–2.00 kg oxalic acid.

20. A process as claimed in claim 18 wherein the first resin component is formed from 6.5 l of NaOH 462 l of formaldehyde 208 l of phenol 5.5 l of glycerol phthalate 8.25 l of lactic acid 40 l of methanol.

21. A process as claimed in claim 19 wherein the second resin component is formed from 227 l of methanol 187 l of sulphuric acid 42 l of lactic acid 30 l of glycerol 134 l of formaldehyde 48 l of phenol 1.75 kg of oxalic acid 3.6 kg of zinc chloride 390 kg of para toluene sulphonic acid.

22. A phenol formaldehyde resin when formed by the process of claim 1.

23. A process as claimed in claim 1 wherein in step (iv) the non aqueous solvent is methanol.

24. A process as claimed in claim 1 whereby in step (v) formaldehyde, an aqueous solution of oxalic acid and phenol are sequentially added to a second reactor, followed by heating and agitating.

25. A process as claimed in claim 1, wherein a filler is added to step (ii).

26. A process as claimed in claim 1, wherein a foaming agent is added to the component formed in step (ii) prior to combining the components in step (vi).

27. A process as claimed in claim 1, wherein in step (vi) the mixture is coated onto a rigid substrate before being allowed to cure.

\* \* \* \* \*